INVENTOR.
Wilhelmus Biessels

INVENTOR.
Wilhelmus Biessels
BY
Wenderoth, Lind & Ponack
Attorneys

United States Patent Office 3,240,548
Patented Mar. 15, 1966

3,240,548
OPTICAL SYSTEM FOR DETERMINING EYE
CHARACTERISTICS
Wilhelmus Johannes Biessels, Lange Poten 17,
The Hague, Netherlands
Filed Feb. 2, 1962, Ser. No. 171,333
Claims priority, application Germany, Feb. 6, 1957,
B 43,412; June 12, 1957, B 44,975; Oct. 16, 1957,
B 46,440
10 Claims. (Cl. 351—17)

This application is a continuation-in-part application of my copending application Serial No. 704,708, filed December 23, 1957, now abandoned.

The present invention relates to improvements in optometric instruments and more particularly to apparatus for subjective eye tests. Hitherto the subjective examination of refractive defects of the human ametropic eye has generally been carried out in the well-known manner of disposing in succession test or trial lenses of different spherical and/or astigmatic dioptric powers in front of the patient's eye so that the patient can determine for himself which trial lens or which combination of trial lenses affords optimum visual acuity when looking at a distant or near test object. The patient is required repeatedly to compare the impression of visual acuity obtained with a new trial lens with his memory of a previous impression. Such decisions are very difficult to make, are tiring for the patient; he ends up with a feeling of uncertainty. The process is time-consuming and leads to relatively vague results, as very many patients cannot remember and compare slightly different visual impressions obtained from a plurality of different trial lenses used in succession. Whereas the dioptric steps leading to exact correction are linear, the progression of visual acuity is non-linear in that it decreases as the point of exact correction is approached. (Exact correction means to complete neutralisation of the eye defects.) That is why the last vital steps in correction, which show the least differences, suffer especially from the disadvantages of the system of successive comparison.

Various attempts have been made to improve on this system of successive comparison by presenting the images for comparison simultaneously to the patient's eye.

The well-known bichromatic test, for instance, utilizes the chromatic aberration of the eye for checking the last spherical steps in correction by presenting adjacent red and green test objects to the eye. However, the bichromatic test cannot provide at all for the simultaneous comparison of images which are astigmatically different. It only provides for spherical differences of about $s +0.25$ D and $s -0.25$ D simultaneously (spherically plus 0.25 dioptres and spherically minus 0.25 dioptres) and not for differences of $s +$ and $-0.5$ D or $s +$ and $-0.75$ D, etc., which are required in cases of low visual acuity during the examination of the eye. In these cases the eye cannot detect the slight differences in sharpness caused by differences of only $s +$ and $-0.25$ D in the bichromatic test. The colors mostly mislead and confuse the patient in that he has a preference for red and often will contend that the red image is sharper, whereas the green image may really be the sharper. The great difference in color impresses the patient far more than does a difference in sharpness.

Other systems are based upon the bifocal or Fresnel biprism principle. Here lenses of different spherical or astigmatic powers are located adjacent and contiguous to each other in front of the patient's eye. The patient has to look through the different portions of the system in succession. Such instruments may provide for simultaneous presentation of images of different dioptric powers, but do not provide for simultaneous and instantaneous comparison, since the visual fields of each lens part are inevitably separated by a wide disturbing zone.

This zone is caused by the dividing line between the lens parts. Even if this line be so called "invisible" the zone has a width of from 1 to 2 metres at 6 metres examination distance to the patient's eye, depending on the size of the pupil and the distance of the dividing line from the eye. Such systems are not a valuable improvement on the old system of using test lenses in quick succession. In principle they constitute a similar system and again bring memory into play. The eye or the head has to move considerably from one image to the other and in this way images are always compared in succession.

Other instruments are based upon the known optometer principle. They are designed for the simultaneous viewing of contiguous images of different spherical powers only. Test objects are built into the instruments at various distances from the eye and are focused at various planes relative to the plane of the retina of the patient's eye by means of a collimator system. The instruments themselves are appreciably shorter than the distances for which the eye is examined, which is at least 5 metres for distant examination. Consequently the patient has the illusion of near vision and will subconsciously accommodate (psychological accommodation). Such uncontrolled and undesired accommodation would lead to faulty prescriptions for spectacles and constitute a disturbing factor.

Other instruments again for spherical refraction only are based upon the pupil-splitting principle. They do not produce images of different dioptric powers, but they double the image of the test object if the eye is ametropic or not corrected spherically. They require small diaphragms through which the patient must look simultaneously; his head may not move. Such instruments do not permit of free and relaxed vision under natural conditions and again lead to undesired accommodation.

Most of the systems mentioned above show differences in size and shape of the images for comparison. Normal trial lenses, for instance, of different spherical powers held in front of the eye and utilized in succession always magnify the images for comparison differently which differences are proportional to the dioptric powers of such lenses and to their distances from the eye. The eye often mistakes different sizes for different sharpnesses, especially if such lenses are stronger than 0.25 D. Similarly, different astigmatic lenses distort the images in different ways, again making it difficult for the patient to decide which image is the sharpest. These differences in magnification constitute a disturbing factor.

It is therefore one of the primary objects of the present invention to provide means of facilitating the subjective determination of the refractive defects of a patient's eye, of safeguarding it against the aforementioned disadvantages and of improving the precision with which spectacles are prescribed.

The main object of the present invention is to provide means for the simultaneous presentation to and the really simultaneous viewing of and judgement by the patient's eye of a plurality of identical test images of varying sharpnesses, which images fall within one visual field and correspond to the different impressions obtained with test lenses, either spherical or astigmatic, hitherto mostly presented successively and focused in different planes relative to the retina, here referred to as "images of different dioptric powers."

Another important object of the invention is to provide means of forming simultaneously and very close together, i.e. contiguously (almost touching or really touching), at least two images as mentioned above of different dioptric powers, which images are simultaneously seen and judged by the patient's eye without any appreciable movement of the eye from one image to another, thus practically reducing the memory factor to zero. For this purpose the invention enables the comparable contiguous images easily to appear simultaneously on the highly developed central area of the retina, called the foveola, in the middle of the fovea centralis.

According to S. L. Polyak (The Retina, Chicago University Press 1948) the foveola is approximately 0.4 mm. in diameter, which corresponds to a visual angle of about 0.025 radian, involving a separation of about 15 cm. at 6 metres or 0.75 cm. at 30 cm. In the center of this foveola there is a still more highly developed area about 0.1 mm. in diameter constituting the area of highest and constant visual acuity. Here each retinal cone is connected to only one ganglion cell and one nerve fibre. The latter area corresponds to a visual angle of about 0.006 radian, involving a separation of about 4 cm. at 6 metres or 0.2 cm. at 30 cm. Images falling simultaneously within this constant area are always seen, compared and judged simultaneously with maximum sharpness, thus practically eliminating the necessity for moving the visual axis from one image to the other and entirely cutting out the memory factor.

The invention provides means whereby the images for comparison are presented simultaneously within the aforementioned smallest constant area of the retina. They can be separated at will or can even be made to touch, whereby the visual field is never broken up by any dividing line or zone. The contiguity of the images for comparison according to the invention ensures the greatest attainable degree of reliability and foolproofness.

If one of the images lies outside the retinal field of 0.1 mm. it is seen more or less indirectly, depending on its separation from the other, directly observed image. The zone of about 0.4 mm., surrounding and embracing the central area of 0.1 mm., however, possesses almost the same excellent and exceptional visual properties. Therefore, viewing images falling within the 0.4 mm. zone of the foveola hardly calls for any noticeable movement of the eye. Images, however, which are separated by more than 0.4 mm. on the retina can no longer be compared simultaneously. One of the images falls outside the foveola with its extraordinary visual properties and its maximum of visual acuity, whereas visual acuity decreases rapidly as the image moves away from the foveola. The eye has to move from one image to the other; the images fall on the retinal center in succession and the factor of visual memory inevitably comes into play, as it does with the old system of test lenses quickly presented successively.

Therefore, instruments which only provide for the simultaneous presentation of images of different dioptric powers, but which do not provide for simultaneous comparison, since their images are separated by more than the diameter of the foveola, are no valuable improvement on the old system.

Yet another object of the present invention is to provide means enabling a differentiation to be made between comparable images only in regard to the sharpness thereof, at the same time eliminating practically the differences in the other common characteristics of the comparable images, such as their size, shape, color and brightness, thereby eliminating any psychological errors due to such differences.

Differences in size and shape are overcome by utilizing the optical principles for systems with magnification one. In the invention virtually monochromatic light of the same color for all the comparable images is even used in preference to white light in order to cut out the chromatic aberration of the eye, increasing the differences in sharpness, so making the choice still more foolproof and increasing the accuracy of the prescription. It goes without saying that the images for comparison should be of equal brightness to obviate any preference for a brighter image instead of the required preference for the sharper image.

The invention provides for differences of any desired dioptric power, both spherical and astigmatic.

Another important object of the invention is to provide means of avoiding accommodation of the eye during the act of comparison in distant examination. The invention therefore provides for free and relaxed vision at objects which are really presented at examination distance, i.e. for distant examination at from 5 to 6 metres, which for all examinations is regarded as equal to infinity. The contiguity of the images within one visual field in the instruments according to the invention is another reason why accommodation is almost completely suppressed. This will be shown later.

Therefore, the invention consists of optical systems for determining various visual characteristics of a patient's eye to be examined, such as spherical and astigmatic defects.

Therefore, the invention consists of optical systems for determining various visual characteristics of a patient's eye to be examined, such as spherical and astigmatic defects, comprising at least one test object disposed at examination distance from said eye, and optical means arranged in such relation to said object and said eye that a plurality of contiguous images or at least comparable parts of them, practically or even exactly identical in size, shape, color and brightness but differing in dioptric powers to any desired extent and falling within one visual field, are simultaneously formed on the retinal center of said eye preferably within the foveola, said images being perceived, compared and judged simultaneously without any noticeable change in the direction of the visual axis during the act of comparison, the result of which no longer depends on the patient's memory of a previous impression.

The invention utilizes image splitting or distributing devices which split the light coming from the test object into two groups of rays of substantially equal color. These devices are—apart from certain light losses—substantially semitransmitting for each of the groups of rays so that images of equal color and brightness are produced. The differences in dioptric powers and sharpnesses are caused by one or more differently refracting elements coordinated to each differing ray path. Each ray path utilizes the full size of the pupil of the patient's eye. The lens sizes in the instruments are a multiple of the pupil of the patient's eye and the apertures are of such a size, that the patient's eye and head are free to move. Thus the invention permits of free vision under most natural conditions.

These and other aspects and features of the invention will be apparent from the following detailed explanations of preferred embodiments of the invention in connection with the accompanying drawings, without in any way being limited to the embodiments hereinafter set forth.

In the drawings, which are diagrammatic:

FIG. 1 shows the paths of rays reaching the retina of a patient's eye through an image-duplicating element, the essential part is an oblique transparent mirror, allowing a beam I coming from a separate test object $y$ on the left to reach the patient's eye direct, and reflecting a secondary beam II from the same test object into the eye in a direction slightly different from that of beam I, each beam passing through different lenses, which can be either spherical or astigmatic.

FIG. 2 shows an instrument similar to FIG. 1 in which, however, the single lenses have been replaced by different optical lens systems, and the mirrors have been replaced by a prismatic structure.

FIG. 3 shows the paths of rays reaching the retina thru an image duplicating element, the essential part of which consists of a slightly prismatic lens of birefringent material, for instance calcite, which splits the incident light pencil up into two differently polarized and differently focused groups of rays, the birefringent lens being combined with a compensating lens of single refringent material, for instance, glass.

FIG. 4 serves to explain the principles of FIG. 3.

The following general remarks may be made with regard to the embodiments of the invention as disclosed by the drawings.

Figure 1:
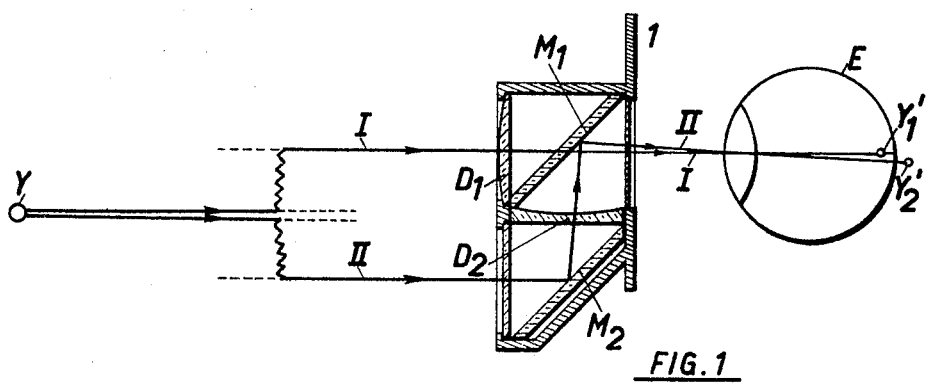
Figure 2:
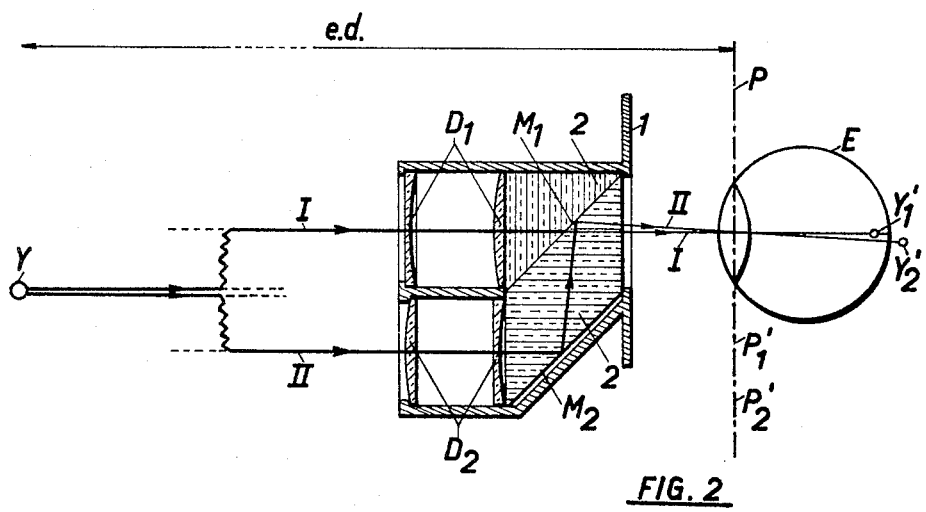
Figure 3:
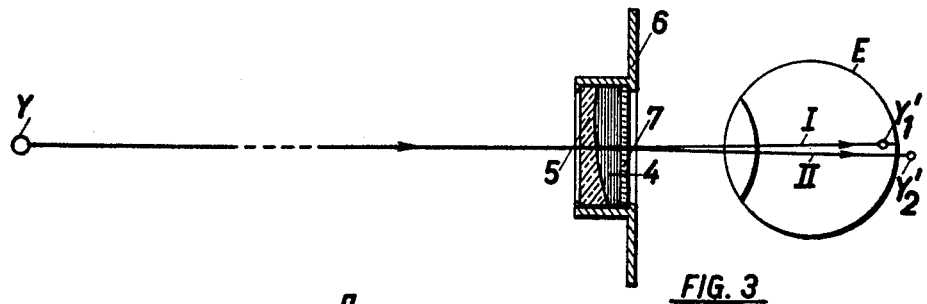

(1) The patient's eyes according to the situations shown in FIGS. 1, 2 and 3 are assumed to be emmetropic or, alternatively, properly corrected.

(2) The usual trial frame, phoropter or refractor-head with correction lenses should be positioned close to the eye in the customary manner. The various instruments according to the invention are, therefore, positioned immediately in front of the trial lenses which are not shown in the drawings and constitute accessories to the usual trial lens system.

(3) The differences in sharpness between the images presented simultaneously, caused by different vergences of the beams in the instruments, should preferably correspond to the values and dioptric steps used hitherto in subjective refraction, the examination being performed according to the same principles.

For instance, let it be assumed that in a double image comparison instrument (see FIGS. 1 and 2) in the first ray path (I) a correction element having a spherical refraction of $s +0.25$ D is incorporated, and in the second ray path (II) a correction element of $s -0.25$ D. If the patient states that he can perceive the first image $y_1'$ better and sharper (FIG. 11), the conclusion is that this image is nearer to the retina than the other one $y_2'$. So he should be given a lens differing from the original power by for instance $s +0.25$ D. If he says the second image $y_2'$ is sharper, a lens differing by $s -0.25$ D should be inserted in the trial frame. If he sees both images with equal sharpnesses or unsharpnesses the eye is properly corrected, because balance in sharpness has been achieved as shown in FIGS. 1–3 and 10.

(4) When spherical refraction is checked for distant examination and balance in sharpness has been achieved, one might think that the patient would accommodate to the image $y_2'$, normally focused behind the retina. Both images $y_1'$ and $y_2'$ would then move to the left in the drawings; $y_2'$ would become sharper, but at the same time $y_1'$ would become more blurred. However, there is a psychological reason why the eye will not accommodate to the image behind the retina. Since the images for comparison of the same color and character are contiguous and simultaneously fall within the foveola, the eye will get the impression that it sees a doubled test object at infinity. If the eye were to accommodate, one part of the object would become sharper and the other part would become more blurred. So the eye would not benefit in any way by accommodation since it strives to see the whole object field regularly sharp. Consequently there will be no occasion whatever for the eye to accommodate, as it does with the old system of using spherical plus and minus lenses in succession.

(5) One proceeds with the examination for astigmatism in a similar manner to that for spherical refraction, preferably by the simultaneous presentation of two images corresponding to well-known cross-cylinders such as $$s +0.25 = c -0.5$$

(spherical plus 0.25 diopter combined with cylinder minus 0.5 diopter) in two positions with cylindrical axes at 90° to each other according to the axes of the astigmatism of the eye. Here as a rule accommodation does not influence the accuracy of a test.

(6) The test objects should preferably be virtually monochromatic and of the same color so as to avoid the slight unsharpnesses caused by the chromatic aberration of the eye and so increase the differences in sharpness of the images for comparsion.

(7) The test objects should be disposed at examination distance exterior to the housing (see e.g. in FIGS. 1, 2 and 3), being usually 5 to 6 metres for distant examination, or various reading or working distances.

(8) The subjective examination preferably starts by placing in the trial frame the spherical and astigmatic powers obtained by previous objective examination or the values of the distant spectacles already worn by the patient.

Referring now more particularly to the drawings:

In FIG. 1 the instrument is placed in front of the patient's eye, whereas the object $y$ is placed at examination distance e.g., for instance 6 metres for distant examination. The instrument itself consists of a housing 1 in which two almost parallel mirrors $M_1$ and $M_2$ are placed at about 45° to the visual axis. Mirror $M_1$ is about 50% transmitting and reflecting and $M_2$ is opaque. Of the rays coming from the test object $y$ two beams I and II enter the instrument. Beam I passes through lens $D_1$, e.g. $s +0.25$, through mirror $M_1$, enters the eye E and produces an image $y_1'$ on the retina, which image is sharply focused in front of, on, or behind the retina, depending on the defect of the eye. If this eye be emmetropic or properly corrected with lenses between the instrument and the eye, the image $y_1'$ concerned will be sharply focused 0.25 D in front of the retina as shown in the drawing and will be seen slightly unsharp. Beam II passes through lenses $D_2$, e.g. $s -0.25$ D, is reflected by mirror $M_2$ onto mirror $M_1$, which reflects it into the eye E, producing an image $y_2'$, focused 0.5 D farther away from the eye lens than $y_1'$ and 0.25 D behind the retina if the eye be emmetropic again and will then also be seen slightly unsharp. Lenses and mirrors are placed in such a way that the retinal images are contiguous. The right correction is obtained when the images are equidistant from the retina, so that they are seen equally slightly unsharp, according to the situation shown in the drawings. The images are "balanced."

If one of the images is sharper than the other, we have an indication as to the sense in which the spherical correction in the trial set should be altered. For checking astigmatism lenses $D_1$ and $D_2$ should preferably be the known crossed cylinders with axes perpendicular, e.g. $s +0.25=c -0.5$ in $x$ degrees and $s +0.25=c -0.5$ in $x+90$ degrees.

Since the lenses $D_1$ and $D_2$ are of opposite values and removed from the eye E, the sizes of the retinal images will be different. The stronger the lenses are and the further they are from the eye, the greater the differences will be. If lenses $D_1$ and $D_2$ are cross-cylindrical the sizes and shapes of the images will be identical, but the images will be distorted at different angles.

The brightness of each of the images lies in the range of 50% of that of the original as seen without the instrument. The brightness can be made equal by giving the mirrors the appropriate absorption/reflection proportion, and if necessary by the use of correction filters.

If required the number of comparable images can be increased by the superposition of additional transparent oblique mirrors and their lenses.

FIG. 2 differs from FIG. 1 in that mirrors $M_1$ and $M_2$ are part of a common prismatic structure 2 and in that the lenses $D_1$ and $D_2$ have been replaced by attachment lens systems $D_1$ and $D_2$ computed in such a way that the sizes and shapes of the images $y_1'$ and $y_2'$ are identical. This is achieved when the image side principal planes $P_1'$ and $P_2'$ of the lens systems coincide with the eye lens plane P. Systems $D_1$ and $D_2$ have a magnification of 1 to the eye, the optical principle of which is known. In other respects the lens systems $D_1$ and $D_2$ have the same dioptric powers (spherical or astigmatic) as those of FIG. 2, however, without the disadvantages due to magnifications differing from one and differing from image to image.

The system of FIG. 3 works on an image splitting principle different from FIGS. 1 and 2 in that it utilizes the special properties of birefringent crystals. Calcite, for instance, splits and divides the incident light into two groups of rays of approximately 50% each, the ordinary and the extra-ordinary rays. These groups of rays are refracted differently by the crystal and have opposite polarisation. Calcite has "isolocally" different refractive indices for each of the rays of 1.66 and 1.49 for the ordinary and the extra-ordinary rays respectively.

A lens made of calcite can be ground to isolocal powers of $s +1.9$ D and $s +1.4$ D for the rays mentioned above and therefore shows two focal points on either side of it. If such a birefringent lens is combined with a compensating glass lens of $s -1.65$ D the resulting isolocal dioptric powers will be $s +0.25$ D and $s -0.25$ D.

(Isolocally different refractive indices and dioptric powers should not be confused with different refractive indices and dioptric powers in, for instance, a bifocal system in which different refractive indices and dioptric powers are located in different, adjacent and contiguous parts of the lens.)

Figure 4:
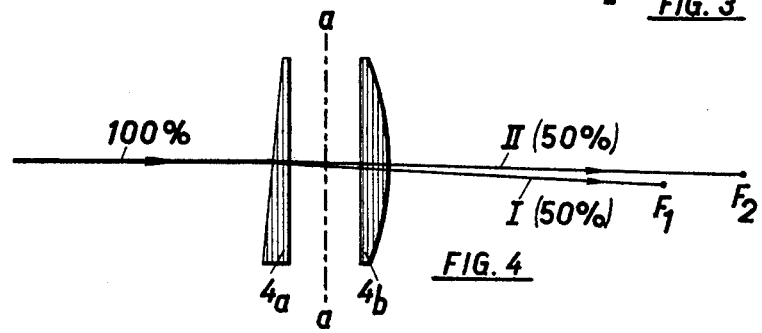

In FIG. 3 a slightly prismatic lens 4 of birefringent material is combined with a slightly prismatic compensation lens 5 of opposite sign of normal refringent material, e.g. glass, in a housing 6. Lens 5 compensates for the desired range of dioptric powers. The prismatic birefringent lens 4 can be regarded as a combination of a prism 4a and a lens 4b (the latter as described above), see FIG. 4. The crystal axis $aa$ of lens and prism lies in the plane of the combination. The birefringent prism 4a divides the incident light into two slightly divergent groups of light or ray paths I and II of opposite polarisation. These two groups of rays then pass through lens 4b by which they are differently focused at $F_1$ and $F_2$.

The curvatures and optical centers of lenses 4 and 5 are so computed that the retinal images $y_1'$ and $y_2'$ are contiguous and correctly centered, and that they correspond to the spherical or astigmatic powers given in the description of FIG. 1. As in the system of FIGS. 1 and 2, the system of FIG. 3 is substantially semi-transmitting for each of the retinal images, which again are not separated by any dividing zone; the visual fields again coincide. The eye does not notice the difference in polarisation which is therefore not utilized. For spherical tests, however, it is also possible to split up the test object into two different observation parts by covering them with two polarisation foils with axes at 90° to each other. In such cases lenses 4 and 5 need not to be prismatic.

Since the vergence altering lenses of FIG. 3 are positioned closer to the eye than those of FIG. 1, the differences in size and shape of the retinal images can practically be ignored for dioptric powers of + an —0.25 D, because these are slight and of the same magnitude as those encountered when using such trial lenses in succession in the usual way directly in front of the eye. However, a birefringent system can be computed in such a way that the magnification again equals 1 as has been done in FIG. 2. This will be shown later in FIG. 9.

Birefringent materials often have slightly different transmission factors for the ordinary and the extra-ordinary rays. Consequently the images might be somewhat different in brilliance. This difference can be eliminated if desired by adding a polarizing filter 7 (FIG. 3) with its axis at an appropriate angle (about 45°) to the crystal axis.

If desired the number of comparable images can be increased by placing two systems according to FIG. 3 one behind the other with crystal axes at 45° to each other.

Figures 5, 6:
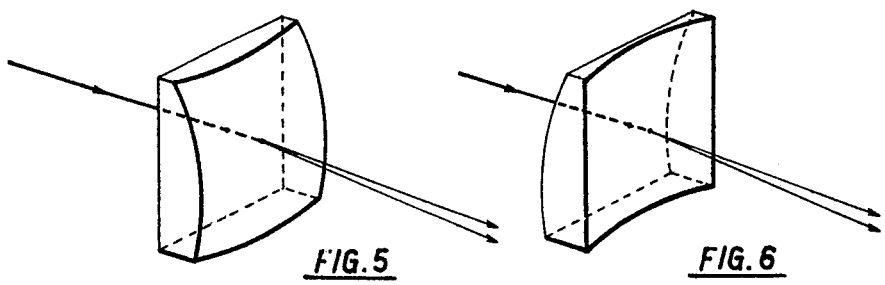
FIG. 5 shows a perspective view of a spherical prismatic birefringent lens such as is used in the instrument of FIG. 3 designed for spherical tests.
FIG. 6 shows a perspective view of a lens similar to that in FIG. 5 with cylindrical surfaces of opposite signs with their cylindrical axes perpendicular for astigmatic or what are known as cross-cylindrical tests.

FIG. 5 shows a prismatic spherical lens in perspective as used and described in FIG. 3 (lenses 4 and 5) and later in FIGS. 7, 8 and 9.

FIG. 6 shows a prismatic cross-cylindrical lens in perspective as used in the figures mentioned above. For the sake of simplicity one side of the lens is shown as a minus cylinder and the other side as a plus cylinder. Of course such lenses can be ground torically with similar results. Such a lens of calcite can be ground to produce simultaneously two cross-cylindrical dioptric powers of, for instance, $s +1.9=c -3.8$ axis 90° and $s +1.4=c -2.8$ axis 180° for the ordinary and the extra-ordinary rays respectively. The complementary glass lens (5 in FIG. 3) should then be ground to $s -1.65=c +3.3$ axis 90°, the system giving the following different dioptric values: $s +0.25=c -0.5$ axis 90° and $s +0.25=c -0.5$ axis 180° as normally used in the cross-cylinder method for the examination of astigmatism.

Figures 7, 8, 9:
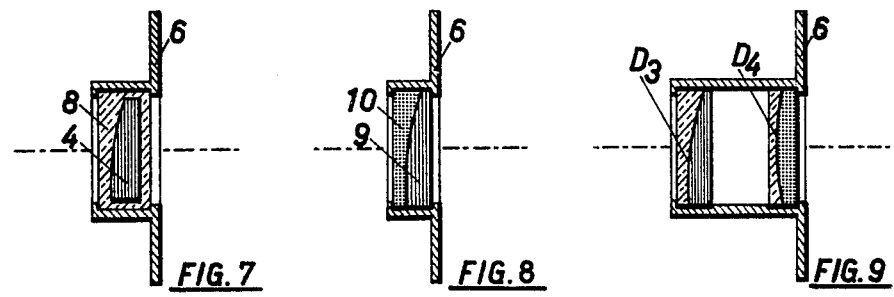
FIG. 7 shows a system similar to that used in FIG. 3 in which the birefringent lens is encased in plastic material or in a fluid.
FIG. 8 shows a system similar to FIG. 3 in which two birefringent lenses of opposite signs have been combined.
FIG. 9 shows a system similar to that used in FIG. 3 in which, however, two lens systems according to FIGS. 3, 7 or 8 are positioned in front of the patient's eye.

In FIG. 7 a birefringent lens 4 (similar to lens 4 of FIG. 3) is enclosed in plastic or a fluid 8. If the refractive index of this material 8 is exactly midway between the refractive indices of the birefringent material the outer surfaces of the plastic or the fluid case can be made plano-parallel, thus avoiding the necessity of grinding a complementary lens. The plastic or fluid 8 then acts as the complementary lens 5 of FIG. 3. It seals the lens off from the air, at the same time the slight differences in brilliance of the comparable images, due to different reflexion losses according to the different refraction indices, will be further reduced.

FIG. 8 shows a system similar to that of FIG. 3, in which, however, two birefringent lenses 9 and 10 of opposite sign with crystal axes perpendicular are combined according to the well-known Wollaston prism principle, so that they complement and compensate each other. This special combination completely eliminates the differences in brilliance mentioned above, as well as many other small aberrations (such as chromatic aberration) common to single birefringent lenses or prisms.

FIG. 9 shows a system in which two systems $D_3$ and $D_4$, each similar to those of FIGS. 3, 7 or 8 are combined. Only one of these systems needs to be prismatic to achieve the visual separation of the images. The whole system is computed in such a way that the image side principal planes $P_1'$ and $P_2'$ of each group of rays coincide with the eye lens plane P, just as they do in the separated systems $D_1$ and $D_2$ of FIG. 2. In this way the small disadvantages of the slightly different sizes and shapes of FIGS. 3, 7 and 8 is entirely overcome. Again the magnification for each of the images equals 1, as is the case in FIG. 2.

Figures 10, 11:
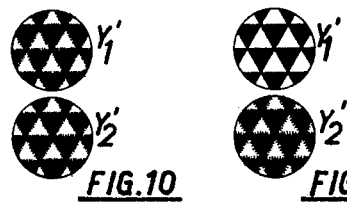
FIG. 10 shows a pair of contiguous images as seen by the patient's eye according to the situation shown in FIGS. 1, 2 and 3.
FIG. 11 shows a similar pair of images of different sharpnesses if one of the images is focused in a plane nearer to the retina than the other image.

FIG. 10 shows the pair of balanced contiguous images $y_1'$ and $y_2'$ as seen through the instruments according to the situation shown in FIGS. 1, 2 and 3. The images are equally sharp or unsharp.

FIG. 11 shows the unbalanced images $y_1'$ and $y_2'$ if one of the images ($y_1'$) is nearer to the retina than the other one ($y_2'$) in spherical refraction or is seen sharper in cross-cylindrical examination.

It is intended that changes and modifications of the invention based on well-known optical or mechanical principles, or a combination of more than one of the instruments described or parts of the instruments described to form another instrument to produce more than two images, or a combination of such instruments with other refraction instruments, or an extension of the application of such instruments to embrace binocular tests, etc., should fall within the scope of the present invention and that such obvious changes and modifications should be embraced by the invention as defined by the claims annexed.

I claim:

1. An instrument for determining various refractive defects of a patient's eye, comprising a ray-splitting semi-transmitting optical means which split incident light coming from a test object into two beams of rays of similar color and of substantially half of the intensity of said incident light, each of said beams having a diameter larger than that of the pupil of said eye into which said beams are directed at a small predetermined angle to each other, each beam covering and utilizing the full size of said pupil, said beams providing simultaneously two contiguous retinal test images of substantially similar color and brightness, and lens means positioned in at least one of said beams of rays causing the rays of one beam to differ spherically in vergence from the rays of the other beam when entering the eye if spherical lens means is employed for the examination of spherical eye defects, and to differ astigmatically from one another if astigmatic lens means is employed for the examination of astigmatic eye defects, the patient's eye focusing said beams in axially separated planes perpendicular to the visual axis, the sharpnesses of said contiguous images being easily compared with the least possible effort of memory.

2. An instrument according to claim 1 wherein said ray-splitting semi-transparent means comprises a housing having a first objective opening, a second objective opening adjacent said first objective opening and an ocular opening opposite said first objective opening, a semi-transparent mirror being disposed obliquely between said first objective opening and said ocular opening and allowing substantially half of the light of a first beam from a test object to pass substantially rectilinearly through said first objective opening, said semi-transparent mirror and said ocular opening successively, a second mirror being disposed obliquely behind said second objective opening to reflect toward said semi-transparent mirror a second beam from said test object passing said second objective opening, said semi-transparent mirror reflecting substantially half of the light of said second beam to said ocular opening, the angular position of said two mirrors in combination with the centering of said lens means being so adjusted that the two image beams have slightly different directions when entering the eye.

3. An instrument according to claim 2, wherein each of the employed spherical lens means comprise two spherical lenses of opposite sign forming together different spherical lens systems, and wherein each of the employed astimatic lens means comprise two astigmatic lenses with cylinder axes being perpendicular forming together different astimatic lens systems, said lenses being so computed and arranged that the image side principal plane of each of said lens systems coincides with the eye lens plane, said lens systems thereby providing magnification one for each of the retinal images, whereby said images are made identical in size and shape.

4. An instrument according to claim 1, wherein said ray-splitting semi-transparent means comprises at least one birefringent prism capable of splitting incident rays into two differently polarized and differently directed rays, said spherical lens means comprising a spherical birefringent lens forming together with said birefringent prism a birefringent prismatic spherical lens for the determination of spherical eye defects, said astigmatic lens means comprising an astigmatic birefringent lens forming together with said birefringent prism a birefringent prismatic astimatic lens for the examination of astigmatic eye defects, said birefringent prismatic lens splitting rays coming from said test object into two beams having slightly different directions, a further prismatic lens of opposite sign and base being added to alter the differing vergences into two appropriate vergences.

5. An instrument according to claim 4 wherein said further prismatic lens is made of a single-refringent material.

6. An instrument according to claim 5, wherein said birefringent prismatic lens is placed in a transparent container filled with a transparent fluid, which fluid constitutes said single-refringent prismatic lens.

7. An instrument according to claim 5, wherein said birefringent prismatic lens is enclosed in transparent plastic material which constitutes said single-refringent lens.

8. An instrument according to claim 4 wherein said further prismatic lens is made of birefringent material with a crystal axis perpendicular to that of the other prismatic lens.

9. An instrument for determining various refracting defects of a patient's eye, comprising a housing having a first objective opening, a second objective opening adjacent said first objective opening, an ocular opening opposite said first objective opening, a semi-transparent mirror being disposed obliquely between said fisrt objective opening and said ocular opening and allowing substantially half of the light of a first beam from a test object to pass substantially rectilinear through said first objective opening said transparent mirror and said ocular opening successively, a second mirror being disposed obliquely behind said second objective opening to reflect towards said semi-transparent mirror a second beam from said test object passing said second objective opening, said semi-transparent mirror reflecting substantially half of the light of said second beam to said ocular opening, said beams having a larger diameter than the pupil of the patient's eye into which said beams are directed, each covering and utilizing the full size of said pupil, and lens means being positioned in at least one of said beams, causing the rays of one beam to differ spherically in vergence from the rays of the other beam when entering the eye if spherical lens means is employed for the examination of spherical eye defects, and to differ astigmatically from one another if astigmatic lens means is employed for the examination of astigmatic eye defects, the angular position of said two mirrors in combination with the centering of said lens means being so adjusted that the two image beams have slight different directions when entering the eye, to form contiguous retinal images, the patient's eye focusing said beams in axially separated planes perpendicular to the visual axis, the sharpnesses of said contiguous images being easily compared with the least possible effort of memory.

10. An instrument according to claim 9, wherein each of the employed spherical lens means comprise two spherical lenses of opposite sign forming together different spherical lens systems, and wherein each of the employed astigmatic lens means comprise two astigmatic lenses with cylinder axes being perpendicular forming together different astigmatic lens systems, said lenses being so computed and arranged that the image side principal plane of each of said lens systems coincide with the eye lens plane, said lens systems thereby providing magnification one for each of the retinal images, whereby said images are made identical in size and shape.

References Cited by the Examiner

UNITED STATES PATENTS

| 742,329 | 10/1903 | Johnson | 88—20 |
| 1,066,026 | 7/1913 | Lorenz | 88—20 |
| 2,023,246 | 12/1935 | Sears | 88—20 |

FOREIGN PATENTS

| 231,848 | 9/1925 | Great Britain. |

JEWELL H. PEDERSEN, *Primary Examiner.*